United States Patent [19]

Brenig

[11] Patent Number: 4,718,081

[45] Date of Patent: Jan. 5, 1988

[54] METHOD AND APPARATUS FOR REDUCING HANDOFF ERRORS IN A CELLULAR RADIO TELEPHONE COMMUNICATIONS SYSTEM

[75] Inventor: Theodore Brenig, Lynchburg, Va.

[73] Assignee: General Electric Company, Lynchburg, Va.

[21] Appl. No.: 929,859

[22] Filed: Nov. 13, 1986

[51] Int. Cl.$^4$ .............................................. H07Q 7/01
[52] U.S. Cl. ......................................... 379/60; 455/33
[58] Field of Search .............. 455/33, 52, 56; 379/60, 379/63, 59

[56] References Cited

U.S. PATENT DOCUMENTS

| | | | |
|---|---|---|---|
| 3,764,915 | 10/1973 | Cox et al. | 325/53 |
| 4,144,411 | 3/1979 | Frenkiel | 379/60 |
| 4,144,412 | 3/1979 | Ito et al. | 379/60 |
| 4,144,496 | 3/1979 | Cunningham et al. | 325/53 |
| 4,384,362 | 5/1983 | Leland | 455/33 |
| 4,435,840 | 3/1984 | Kojima et al. | 455/33 |
| 4,475,010 | 10/1984 | Huensch et al. | 379/60 |
| 4,545,071 | 10/1985 | Freeburg | 455/33 |
| 4,597,105 | 6/1986 | Freeburg | 455/33 |
| 4,613,990 | 9/1986 | Halpern | 455/33 |
| 4,670,905 | 11/1985 | Sanovos et al. | 455/33 |
| 4,670,906 | 6/1987 | Thro | 455/56 |

OTHER PUBLICATIONS

Brody et al., "Application of Digital Switching in a Cellular Mobile Radio System", International Switching Symposium, (May 7-11, 1984, Florence, Italy).
Ma et al., "DMS-MTX Turnkey System for Cellular Mobile Radio Application", IEEE 1984 Vehicular Technology Conf., Pittsburgh, Pa., (May 1974).
Cellular Business, Apr. 1985, p. 8, "Motorola Papers Hit Omni Cell Sites".

Primary Examiner—Robert Lev

[57] ABSTRACT

Wrong handoffs in a cellular radio telephone RF communications system can be minimized or eliminated without increasing locating receiver equipment requirements, field strength measurement time or system response time. Field strength measurements are made at handoff candidate cells and also at cells neighboring (geographically proximate to) those candidate cells. A weighted average of the measured field strength of the candidate cell and the field strength measured in cells neighboring the candidate cell is calculated for each candidate cell (the field strengths measured by neighboring cells may be multiplied by a weighting factor of 0.5). The weighted averages for the candidate cells are compared, and the candidate cell corresponding to the highest average is selected to handle the mobile transceiver call. Statistical analysis shows that this technique for determining handoff candidates significantly reduces the probability that a call will be handed off to a cell which is geographically distant from the mobile transceiver—even in the presence of propagation anomalies.

22 Claims, 4 Drawing Figures

METHOD AND APPARATUS FOR REDUCING HANDOFF ERRORS IN A CELLULAR RADIO TELEPHONE COMMUNICATIONS SYSTEM

FIELD OF THE INVENTION

The invention generally relates to cellular radio telephone communications systems, and more particularly, to selecting the most appropriate stationary radio transceiver in a cellular radio telephone communications system for establishing and maintaining communications with a mobile ratio transceiver. Still more particularly, the invention relates to techniques for handing off ongoing radio communications with a mobile radio transceiver from one stationary radio transceiver to another as the mobile radio transceiver changes location.

BACKGROUND OF THE INVENTION

The basic structure and operation of a cellular telephone communications system has been disclosed in a variety of publications. See, for example, the January 1979 issue of *The Bell System Technical Journal;* and Specification EIA IS-3-B (as amended) entitled "Cellular System Mobile Station-Land Station Compatibility Specification" (July, 1984, Electronic Industries Association)

As is well known, the process called "handoff" is a fundamental part of the cellular radio telephone scheme. The following publications are generally relevant in disclosing handoff techniques:

Huensch et al: U.S. Pat. No. 4,475,010: OCT 1984
Ito et al: U.S. Pat. No. 4,144,412: MAR 1979
Kojima et al: U.S. Pat. No. 4,435,840: MAR 1984
Cunningham et al: U.S. Pat. No. 4,144,496: MAR 1979
Cox et al: U.S. Pat. No. 3,764,915: OCT 1973
Leland: U.S. Pat. No. 4,384,362: MAY 1983
Frenkiel: U.S. Pat. No. 4,144,411: MAR 1979
Brody et al, "Application of Digital Switching In A Cellular Mobile Radio System", International Switching Symposium (May 7-11, 1984, Florence, Italy)
Ma et al, "DMS-MTX Turnkey System For Cellular Mobile Radio Application", IEEE 1984 Vehicular Technology Conf., Pittsburgh, PA. (May 1974)

A brief description of the handoff process will now be presented. A simplified cellular radio telephone system 10 is shown in FIG. 1. Cellular system 10 includes several fixed RF transceiving stations 12 each serving an associated discrete geographical area ("cell") 14 (a simplified overlapping 7-cell system is shown). A central controller 16 ("MTX") supervises and controls the operation of fixed stations 12. Assume a mobile transceiver 18 has an initial position within cell 14A, but is now moving out of that cell into cell Central controller 16 continuously determines the location of mobile transceiver 18 by requesting stationary transceiver 12A to measure the received signal strength of the mobile transceiver transmissions. When central controller 16 (or stationary transceiver 12A) determines, based on signal strength measurements, that mobile transceiver 18 has moved too far away from stationary transceiver 12A for high-quality communication to be maintained, the central controller attempts to determine which cell the mobile transceiver is moving into (i.e., by requesting all of stationary transceivers 12A–12G associated with cells adjacent to cell 14A to measure mobile transmission signal strength) Central controller 16 then selects the cell with the highest received signal strength as the cell the mobile transceiver is most likely moving into.

The central controller controls the fixed station 12A serving the first cell 14A to discontinue handling the mobile station radio call and controls the fixed station 12B (into which the mobile transceiver is moving) to begin handling the call (and also controls the mobile station to retune to a frequency fixed station 12B operates on). In this way, the mobile station 18 (and its call) is "handed off" to the cell receiving the strongest signal from the mobile station. High quality uninterrupted communication is thus maintained even while mobile station 18 is moving from one cell to another.

System 10 typically measures the RF signal strength of transmissions of mobile station 18 at the locations of fixed stations 12 in order to decide when a handoff should occur and to what cells calls should be handed off to. Decreased received signal strength at a fixed station 12 handling the call of mobile station 18 indicates that the mobile station is nearing the edge of the cell 14 served by the fixed station and is likely to need handing off to another cell. Signal strength measurements performed by fixed station 12 serving adjacent cells are used to determine which cell the call should be handed off to, thus maximizing communications quality and reliability and minimizing the number of handoffs necessary.

When system design includes partitioned cells (pie-shaped sectors, overlayed cells, etc.), signal strength measurements at fixed stations may also be used to determine which cell partition may best serve particular mobile stations.

As will be appreciated, signal strength measurements are very important in the design and operation of cellular radio telephone communications systems, and are indeed an essential requirement of cellular equipment design.

Every handoff in a cellular radio telephone system requires a number of signal strength measurements. Since cellular systems typically serve large numbers of mobile stations, hundreds of signal strength measurements may be required every few minutes. Moreover, because mobile stations are usually in motion, the cellular system must respond very rapidly to changes in received signal strength (e.g., by handing off calls) to maintain acceptable signal levels as mobile stations move from cell to cell. There is therefore a great need for fast and accurate received signal strength measuring techniques.

RF signals transmitted by mobile radio stations are subject to Rayleigh and Gaussian fading, as is well known. Such fades are of short duration and may be 20 dB or more below the average received signal strength level, making it difficult to obtain accurate and rapid signal strength measurements (since a measurement made during a deep fade is not representative of the true average received signal strength of a mobile radio transmission).

Prior art methods of overcoming this difficulty include analog filtering (equivalent to damping a meter movement so that it does not respond to fast transients), and mathematically averaging several samples of received signal strength measured by a given locating receiver. Such prior art techniques require several measurements to be taken over a period of time large enough to mask the effects of fading. Unfortunately, the extended time period required to obtain accurate measurements using such techniques is in conflict with the requirement that received signal strength measurements must be made as rapidly as possible.

As mentioned previously, in the prior art, field strength of signals transmitted by a mobile transceiver during an ongoing call is continuously monitored at the cell site serving the call. If the signal received from the mobile transceiver becomes weak, it is assumed that the mobile transceiver is at cell boundary, and that a handoff is necessary. The cell site controller generates a list of candidate cells (usually cells which neighbor or overlap the serving cell) and commands those candidate cells to measure the signal strength of the mobile transceiver. The cell receiving the strongest signal is assumed to be the cell into which the mobile transceiver is entering, and the call is handed off to that cell.

Sometimes, however, the cell receiving the strongest signal strength is not the best cell to handle the call. For example, RSSI measurements are sometimes made while the mobile transmissions are obstructed (e.g., when the mobile transceiver is on or beneath a bridge, is "shadowed" by a tall building, or passes behind a hill or into a valley). The call may be handed off to a "wrong" cell (i.e., a cell which is physically distant from the mobile transceiver location relative to other, closer cells) because the decision as to which cell is the "best" candidate for handoff must be determined in a relatively short time (to guarantee fast system response time).

For instance, a typical cellular system may be required to make a signal strength measurement over a period of only 40 milliseconds. Due to obstructions in the signal path (e.g., trees and buildings), the field strength measured over such a short period of time can deviate by 12 dB or more from the average field strength for a mobile transceiver in that area.

To improve measurement accuracy, it is necessary to average several field strength measurements acquired over a period of 1 to 10 seconds. Unfortunately, this approach increases response time and system cost. Locating receivers must measure the signal strength of many channels, and are therefore generally busy all of the time (at least during peak hours of cellular system usage). An increase in measuring time requires additional locating receivers and associated peripheral circuits to distribute the field strength measurement work load. If measurement time is made too long, system response time is degraded—and ongoing calls may be lost before a handoff decision is made.

Handoffs to incorrect cells are of concern but are not a serious problem in cellular systems which do not require frequency reuse. Incorrect handoffs increase message traffic (since a call handed off to an incorrect cell will most likely soon have to be handed off to the correct cell), but do not generally result in lost calls or unacceptable service—since the selected handoff candidate, even if it is not the best candidate, may still be guaranteed to provide acceptable service to the mobile transceiver, at least for a short period of time.

Unfortunately, erroneous handoff decisions may produce severe problems in mature cellular systems using frequency reuse. In such mature systems, the same radio operating frequency may be in use simultaneously within several cells of the system (prescribed distances are maintained between co-channel cells to prevent co-channel interference). The potential for co-channel interference is increased if a call to a mobile transceiver is handled by a cell which is physically distant from the mobile transceiver location, since the mobile transceiver in such a case will almost always be operating on a frequency which is not assigned to the cell it is located within. The mobile transceiver, being physically distant from the cell site assigned to use the operating frequency, may be close enough to co-channel cells to cause co-channel interference. In extreme cases, one co-channel call may "block" another, causing the blocked call to be dropped, and resulting in an unhappy customer.

Cell sectorization has been suggested by others as a way to reduce the number of handoffs to incorrect cells, and thus, avoid co-channel interference problems in mature cellular systems Yet, cell sectorization only somewhat reduces and does not eliminate incorrect handoffs. Accordingly, there is a great need for a technique which is applicable to any type of cellular system (omni-directional or sectored) which reduces the number of incorrect handoff decisions without increasing equipment requirements or received signal strength measuring time.

SUMMARY OF THE INVENTION

The present invention provides a solution to the problem of wrong handoffs which may be used to great advantage in any type of cellular system, does not increase locating receiver equipment requirements, and also does not increase field strength measurement time or system response time.

In the present invention, field strength measurements are made in candidate cells and also in cells neighboring those candidate cells. A weighted average of the measured field strength in the candidate cell and the field strength measured in cells neighboring the candidate cell is calculated. This weighted average is compared with similar weighted averages calculated for other candidate cells to determine the "best" candidate cell to hand an ongoing call off to.

The weighted average may be calculated by multiplying the levels of amplitude-indicating signals produced by locating receivers serving cells overlapping the candidate cells to be evaluated by a weighting factor $n$ less than 1, and adding the products to the level of the amplitude-indicating signal produced by the locating receiver serving the candidate cell. The resulting sum is then divided by a normalizing factor to yield a value associated with the candidate cell. This calculation may be repeated for each candidate cell (e.g., each cell overlapping the cell presently serving the mobile transceiver). The cell associated with the highest calculated average value is selected to hand the call off to.

The weighting factor $n$ may be substantially equal to 0.5, and is preferably within the range of 0.2 to 0.6.

BRIEF DESCRIPTION OF THE DRAWINGS

These and other features and advantages of the present invention will be better and more completely understood by studying the following detailed description of presently preferred embodiments together with the appended drawings, of which.

DETAILED DESCRIPTION OF PRESENTLY PREFERRED EMBODIMENTS

Figure 2:
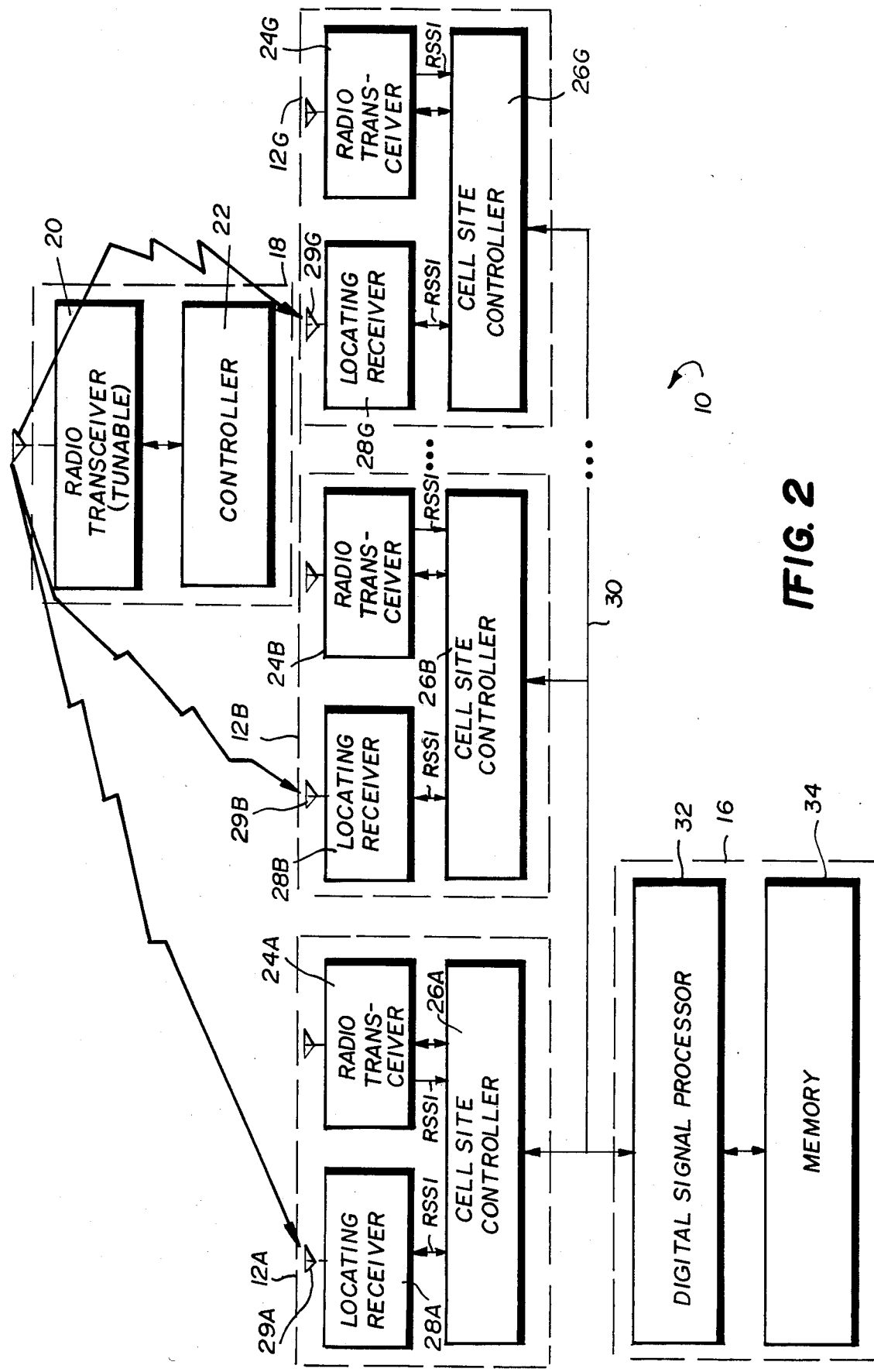
FIG. 2 is a detailed block diagram of the presently preferred exemplary embodiment of the cellular radio telephone communications system shown in FIG. 1.

FIG. 2 is a schematic block diagram of a presently preferred exemplary cellular radio telephone communications system 10 in accordance with the present invention. System 10 includes plural stationary radio transceiving stations 12A–12G associated with corresponding geographical cells 14A–14G; a central controller ("MTX") 16; and a mobile radio transceiving station 18.

Mobile radio transceiver 18 includes a tunable radio transceiver 20 (of conventional design) controlled by a conventional digital signal processor-type controller 22. Stationary transceiving stations 12A–12G each include one or more radio transceivers 24 controlled by a cell site controller 26 (which in the preferred embodiment includes a conventional digital signal processor). Stationary transceiving stations 12A–12G each also include one or more tunable locating receivers 28 which may be controlled by cell site controller 26 to measure RF signal field strength at any desired frequency within a pre-specified range.

Stationary transceiving station cell site controllers 26 communicate with central controller 16 via conventional control and speech signal pathway 30. In the preferred embodiment, pathway 30 includes plural bidirectional digital control signal channels and plural bidirectional voice channels.

Locating receivers 28 in the preferred embodiment are conventional radio receiving devices capable of rapidly tuning to any frequency within their operating range. Each locating receiver 28 has an analog output which provides a measure of the instantaneous amplitude of radio frequency signals (of a selected desired frequency) received by an antenna 29 connected to the receiver. In the literature, such an instantaneous signal strength output has been called "received signal strength indicator" (RSSI). In the preferred embodiment, locating receiver 28 comprises a General Electric cellular station radio channel unit as described in the GE publications designated LPI 31322; or a General Electric Cellular Mobile Radio as described in the GE publication designated LPI 31355

Locating receiver 28 produces an analog electrical output signal ("RSSI") the level of which is a function (e.g., logarithm) of the instantaneous amplitude of radio frequency (RF) signals received at the frequency to which the receiver is tuned. The analog output of receiver 28 is applied to the input of a conventional A/D converter (not shown) which converts the analog output to a digital signal. The converted digital output of locating receiver 28 is applied to I/O port of cell site controller 26. Cell site controller 26 may also produce digital signals which are applied to a digital input of locating receiver 28 to control (in a conventional manner) the frequency to which the locating receiver is tuned.

Cell site controller 26 may be any conventional digital signal processor, and preferably includes a central processing unit, internal registers and counters, a clock oscillator, and the like, all of which are well-known. Cell site controller 26 produces one or more digital output signals which may be transmitted to the central controller 16 via signal pathway 30. Cell site controller 26 also may receive control signals (produced by central controller 16 or by another cell site controller) via signal pathway 30, and may tune radio transceiver 24 to operate on frequencies specified by such digital control signals.

The RSSI signals produced by locating receivers 28A–28G are used for two purposes in the preferred embodiment: to determine when a call handoff is necessary; and to help determine the "best" cell to hand a call off to.

Assume that mobile transceiver 20 is initially within cell 14A and is thus initially communicating radio signals with radio transceiver 24A. Radio receiver 24A continually measures the received signal strength of the radio signal transmitted by mobile radio transceiver 20 to determine when a call handoff may be necessary to maintain high-quality communications. So long as mobile radio transceiving station 18 remains within cell 14A, receiver 24A will continue to receive signals transmitted by mobile radio transceiver 20 at a signal strength above a predetermined minimum acceptable signal strength ("handoff threshold value"), and no call handoff will occur.

Figure 3:
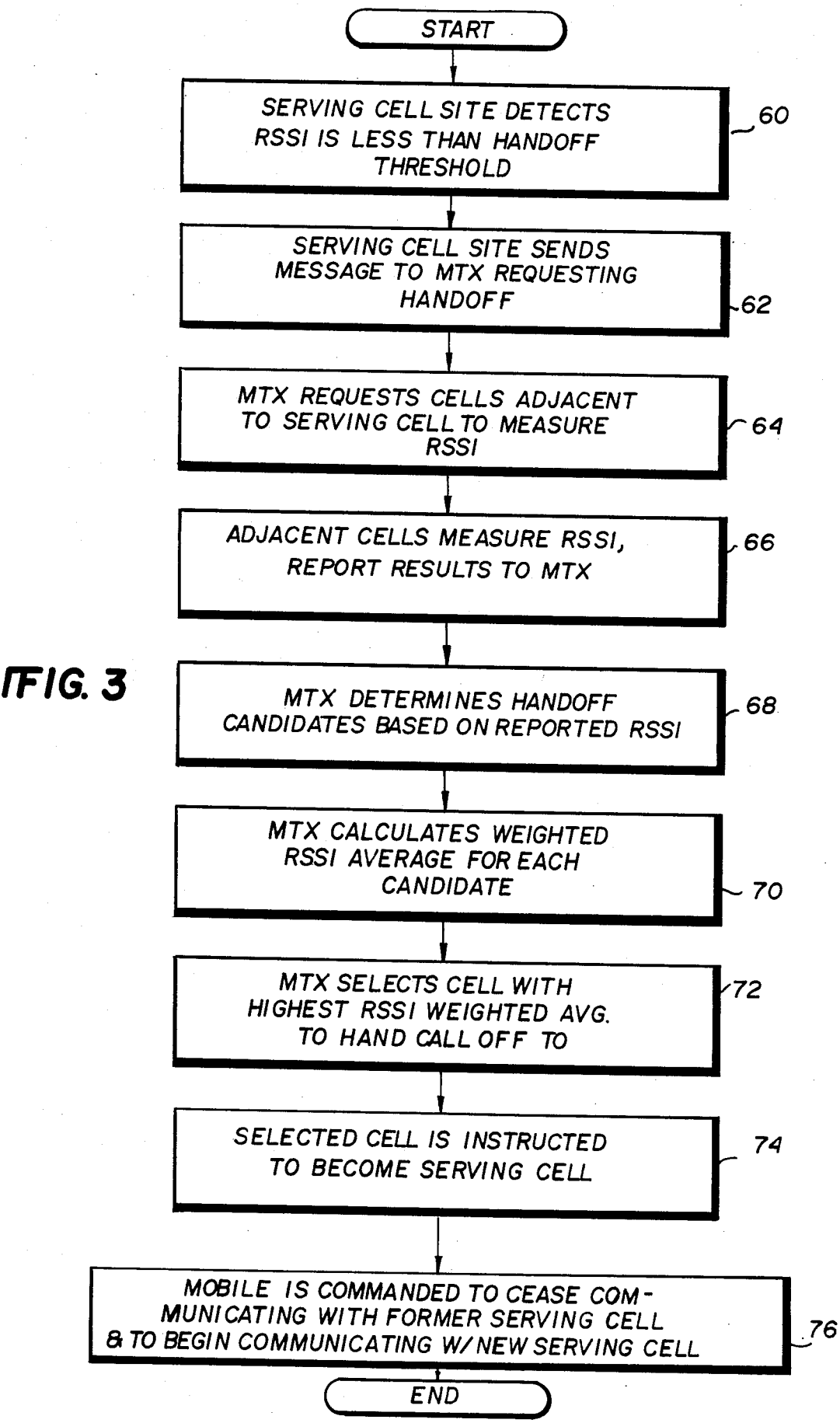
FIG. 3 is a flow chart of some of the relevant control functions performed by the embodiment shown in FIG. 2.

If, however, mobile transceiving station 18 moves toward the edge of cell 14A, the signal strength received by receiver 24A becomes weaker and weaker—until at some point, cell site controller 26A determines that the received signal strength of the signals transmitted by the mobile station has fallen below a minimum acceptable level needed to insure high-quality communications (block 60 of the flow chart shown in FIG. 3). Cell site controller 26A then sends a handoff request to digital signal processor 32 of central controller 16 (block 62 of FIG. 3).

Upon receipt of a request for handoff, central controller 16 first generates a list of cells 14 which are possible candidates for receiving the call handoff. In the preferred embodiment, processor 32 obtains this candidate cell list from a "lookup" table stored in memory 34. Since mobile transceiving station 20 cannot travel from one cell to another without passing through geographically intervening cells as well, the list of candidate cells includes all of the cells "neighboring" the cell presently serving the call (since such "neighboring" cells lie geographically adjacent to the serving cell and, in general, at least partially geographically overlap the geographical area included in the serving cell).

The "best" candidate cell to receive the call handoff is that candidate cell which mobile radio transceiving station 18 is moving into. Central controller 16 does not yet, however, know which cell 14B–14G the mobile radio transceiving station 18 is approaching (or has entered). Central controller 16 commands cell site controllers 26B–26G to measure the received signal strength of signals transmitted by mobile transceiver 20 (block 64). Each neighboring cell site 12B–12G tunes its locating receiver 28 to the frequency at which mobile radio transceiver 20 is operating, samples the RSSI signal produced by the locating receiver, and communicates the RSSI information to central controller 16 (block 66).

Central controller 16 soon receives a series of RSSI measurements corresponding to the received field strength of the mobile radio station transmissions at neighboring cell sites 12B–12G. Digital signal processor 32 selects, from that list, only those RSSI measurements which are significantly greater than the RSSI measurement prompting the handoff attempt to begin with (block 68). Thus, for example, if locating receiver 28A (of the serving cell 14A) measures the signal strength of mobile radio transmissions at below a predetermined handoff threshold value, and no other locating receiver 28B-28G receives the mobile transceiver transmissions at a higher RSSI, no handoff will occur (since communication quality will not be significantly improved by handing off the call to another cell). Digital processor 32 in the preferred embodiment selects, from the RSSI measurements reported back by cell sites 12B-12G, only those measurements which exceed a predetermined minimal handoff threshold value by at least a "delta threshold level" (an added factor which helps insure a handoff transferee cell will not soon attempt to hand off the call to a further cell or back to the original serving cell). The cells corresponding to these selected RSSI measurements may be regarded as "candidate cells", since one of them will be selected as the transferee cell for the handoff.

Signal processor 32 then calculates a weighted average for each handoff candidate cell (block 70). This weighted average takes into account the RSSI measurements of the candidate cell as well as the RSSI measurements of cells neighboring (geographically proximate to) the candidate cell.

As mentioned above, it is generally desirable for a mobile transceiver call to be handled by the stationary transceiver the mobile is geographically closest to. There are occasions, however, when other cells (stationary transceivers) can provide better service. A correct handoff provides a reliable radio frequency path, prevents excessive interference, prevents loss of calls, and minimizes the number of handoffs between cells (i.e., reduces or eliminates "ping-ponging") Generally, a handoff to a physically remote cell may create excessive interference and result in lost calls, and should therefore generally be avoided.

The probability of an incorrect handoff is significantly minimized by taking received signal strength measurements of neighboring cells into account when evaluating a candidate cell for handoff. The preferred embodiment calculates a weighted average of the received signal strength of the candidate cell and the received signal strength of the cells neighboring the candidate cell (the received signal strength of the neighboring cells being weighted equally and less than the received signal strength of the candidate cell in one exemplary arrangement) in accordance with the following equation (1) below:

$$RSSI_{wa} = \frac{RSSI_{candidate} + n\left(\sum_{J=1}^{K} RSSI_{neighbor\ J}\right)}{1 + (n \cdot K)}$$

Where $RSSI_{wa}$ is the weighted average received signal strength associated with a candidate cell, the value $RSSI_{candidate}$ is the received signal strength measured by the candidate cell, n is a predetermined weighting factor, K is the number of cells neighboring the candidate cell, and the value $RSSI_{neighbor\ J}$ is the received signal strength measured by neighboring cell J. In other words, the received signal strength of the candidate cell is added to the sum of received signal strengths of neighboring cells (after those neighboring cell received signal strengths have been multiplied by weighting factor n), and the resulting sum is normalized by dividing it by one plus the total number of RSSI measurements for neighboring cells pre-multiplied by the weighting factor (e.g., $1+n \cdot K$ where K is the number of neighboring cells and n is the weighting factor).

A weighted average value corresponding to each candidate cell is computed by digital signal processor 32 (block 70) (using conventional digital computing techniques and structures), resulting in a list of weighted averages. Digital signal processor 32 selects the candidate cell associated with the highest weighted average as the transferee cell for handoff (block 72). Handoff is accomplished in a conventional manner (e.g., by instructing the selected transferee cell to being handling the ongoing call and/or instructing the mobile transceiver to cease communicating with the cell site transceiver 12A formerly serving the call and to begin communicating with the selected candidate cell (blocks 74, 76)).

The following examples serve to illustrate how the present invention selects correct cells for handoff in situations where an incorrect cell would be selected by the prior art.

Figure 1:
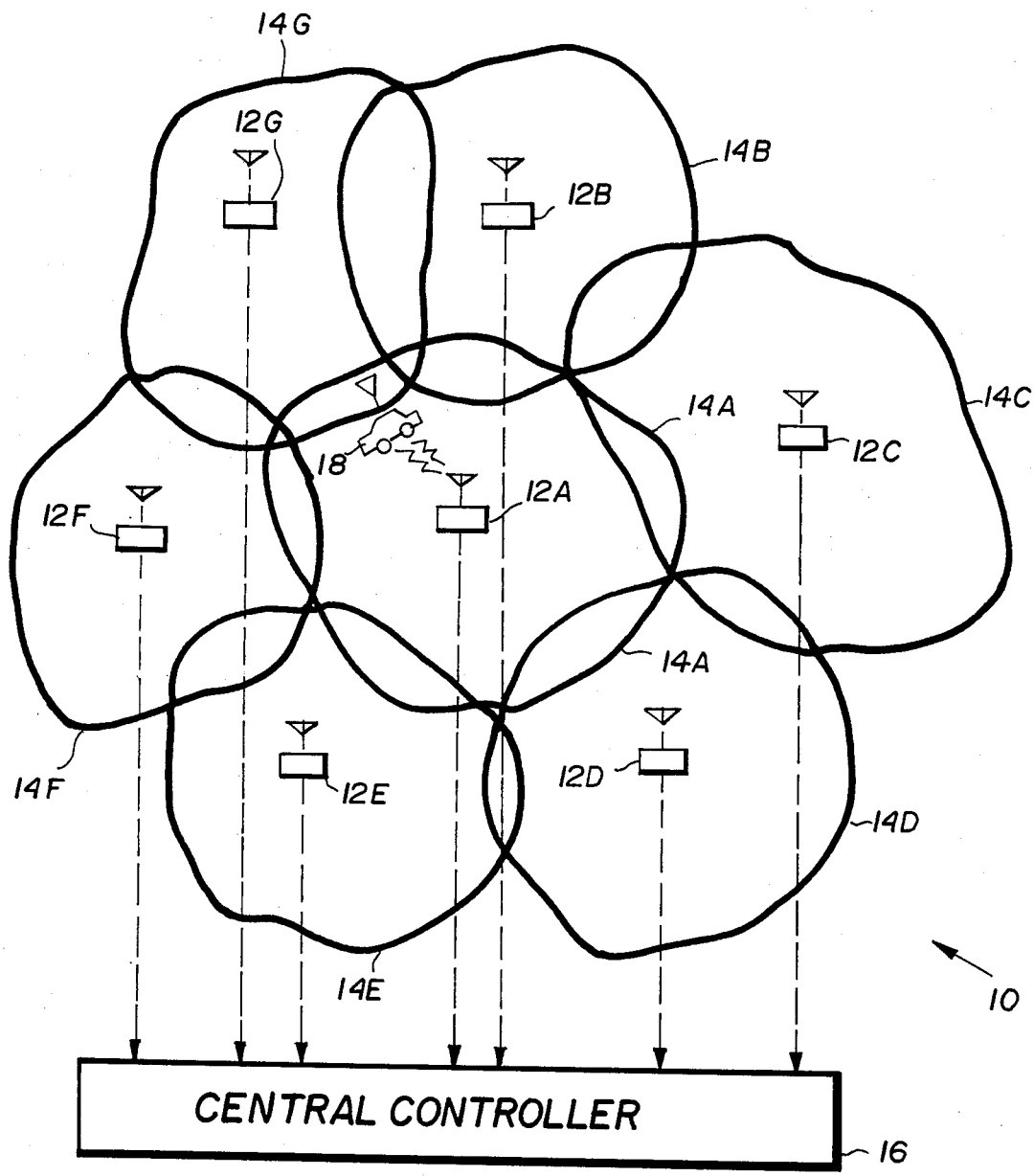
FIG. 1 is a schematic illustration of a simplified exemplary cellular radio telephone communications system.

Suppose that mobile radio transceiving station 18 is located approximately at the position shown in FIG. 1 and is travelling away from cell site transceiver 12A, but that stationary transceiver 12A is still communicating radio signals with the mobile transceiver. Distances between various cell sites and attenuation values calculated for each cell site relative to the attenuation for the serving cell site 12A are shown in Table I below (assuming the attenuation in decibels is signal strength = $-37 \log(distance) + $ site constant, where the site constant is a correction factor which depends on the elevation of the cell site, the type of antenna used, etc.):

TABLE I

| Cell Site | Distance | RSSI (dB) |
|---|---|---|
| 12A | 1 | 0 |
| 12B | 1 | 0 |
| 12C | 2 | −11.1 |
| 12D | 2.65 | −15.7 |
| 12E | 2.65 | −15.7 |
| 12F | 2 | −11.1 |
| 12G | 1 | 0 |

For simplicity, the site constant is assumed to be the same for all cell sites ( although in a real system, cell sites constants will have known values and can easily be taken into account).

Assume now that, because of some obstruction (e.g., a tall building or a hill), the signal strength received by cell site transceiver 12A is below a theoretical value of 0 dB and is also below the handoff threshold value (e.g., −95 dBm). Further assume that attenuation values greater than −8 dB are required for a handoff to occur.

If all of the candidate cells measure the signal values predicted by Table I, cells 14B and 14G would indicate equal, sufficiently strong received signal strengths and one of these cells would be selected as the transferee cell for a handoff. Cells 14B and 14G are geographically closest to mobile transceiving station 18, and thus, both are proper cells to be selected.

As mentioned above, received signal strength is affected by shadowing (caused by obstructions in the signal path resulting in a log-normal distribution of the signal values within relatively small areas) and also by multipath propagation (resulting in Rayleigh distribution of the signal values over very small areas). Typical cellular systems measure received signal strength over a time period sufficiently long to strongly reduce the effects of Rayleigh fading (e.g., about 40 milliseconds or more), but not sufficiently long to eliminate the effects of shadow losses. In a typical environment, the standard deviation of the measured value is approximately 3 to 12 dB because of obstructions in the signal path. Deviations of this amplitude are great enough to cause handoff errors to occur.

The present invention eliminates these errors by taking measurements by several locating receivers into consideration when selecting the best cell to handoff a call to.

For purposes of the present invention, "neighboring" cells are defined as cells with overlapping geographical areas. In the preferred embodiment, the serving cell is not included as a neighbor of any other cell even though the geographical areas of the serving and candidate cells may overlap. Table II below shows the "neighboring" cells corresponding to each of cells 14B-14G.

TABLE II

| Candidate Cell | Neighboring Cells |
|---|---|
| B | C, G |
| C | B, D |
| D | C, E |
| E | D, F |
| F | E, G |
| G | B, F |

The following Table III shows exemplary weighted received signal strength average values for each candidate cells 14B-14G, as calculated from Equation No. 1, using the RSSI values set forth in Table I and using a weighting factor n=0.3:

TABLE III

| Candidate Cell | Weighted Average (dB) |
|---|---|
| 14B | −2.1 |
| 14C | −9.9 |
| 14D | −14.8 |
| 14E | −14.8 |
| 14F | −9.9 |
| 14G | −2.1 |

These weighted average values are obtained in a straightforward manner by digital signal processor 32 performing the calculation set forth in the Equation No. 1 above. For example, the weighted average value for cell 14D is calculated by first adding the RSSI value measured for neighbor cells 14C and 14E (−11.1 and −15.7); multiplying that sum by n (0.3 in this example); adding the RSSI measured for cell 14D (−15.7) to the resulting product; and dividing the resulting sum by 1+n·2 (1.6)

Weighted averages corresponding to candidate cells 14B and 14G are higher than any of the other weighted averages—and thus, the present invention selects either cell 14B or 14G to hand the call off to.

Assume now that, due to propagation variations, cell 14C measures 14 dB more than predicted as shown in the following Table IV:

TABLE IV

| Candidate Cell | RSSI (dB) |
|---|---|
| 14B | 0 |
| 14C | +2.9 |
| 14D | −15.7 |
| 14E | −15.7 |
| 14F | −11.1 |

TABLE IV-continued

| Candidate Cell | RSSI (dB) |
|---|---|
| 14G | 0 |

A 14 dB error is within the range of error which may be caused by shadowing and reflections.

Because cell site controller 12C now reports back the highest received signal strength, the prior art would select cell 14C over cells 14B and 14G to hand the call off to—even though mobile transceiving station 18 is physically distant from the geographical area of cell 14C and from stationary transceiver 12C. This incorrect handoff decision might result in increased interference or an additional handoff (since the average signal level received by cell site 12C is much less than the RSSI values for cells 14B and 14G, and might even be less than the handoff threshold value). In the worst case, a lost call might result from such an incorrect handoff decision.

Table V below list the weighted averages calculated by the present invention from the RSSI values listed in Table IV.

TABLE V

| Candidate Cell | Weighted Average RSSI (dB) |
|---|---|
| 14B | 0.54 |
| 14C | −1.8 |
| 14D | −12.2 |
| 14E | −14.8 |
| 14F | −9.9 |
| 14G | −2.1 |

The present invention selects cell 14B to hand the call off to—despite the fact that cell site 12C has reported a stronger received signal strength due to a propagation anomaly. The variation in the RSSI measured by cell site 12C from its expected value may have been due to terrain—and this same variation results in preference being given to cell 14B (which is closer to cell 14C than is cell 14G). Thus, not only is the cell (14C) with the propagation anomaly rejected, but a cell (14B) which is most likely to be correct is selected instead.

The present invention has the additional advantage that measurements made by locating receivers 28A-28G in different cells are statistically independent from one another. Thus, the present invention also helps to reduce the effects of Rayleigh fading.

Assume now that the signal measured by cell site locating receiver 28B is 7 dB less than predicted; the RSSI measured by locating receiver 28G is also 7 dB less than predicted; and the RSSI measured by cell site locating receiver 28C is 7 dB more than predicted (as shown by the following Table VI).

TABLE VI

| Candidate Cell | RSSI (dB) |
|---|---|
| 14B | −7 |
| 14C | −4.1 |
| 14D | −15.7 |
| 14E | −15.7 |
| 14F | −11.1 |
| 14G | −7 |

If the handoff transferee cell were to be selected based on the highest measured received signal strength, cell 14C would be erroneously selected for handoff.

The present invention, on the other hand, calculates weighted average values as follows:

TABLE VII

| Candidate Cell | Weighted Average RSSI (dB) |
|---|---|
| 14B | −6.5 |
| 14C | −6.8 |
| 14D | −13.5 |
| 14E | −14.8 |
| 14F | −11.2 |
| 14G | −7.8 |

Thus, cell 14B is once again selected by the present invention to hand the call off to—despite significant errors present in measuring received signal strength in three of the six candidate cells.

It has been found that the accuracy of the handoff decision making process has been improved significantly by taking the values measured by neighboring cells into account. In those cases in which the variation from the expected value is so high that a more distant candidate cell is selected, it can be safely assumed that this cell should indeed be selected and that any variation of the measured value from the expected value is caused by a significant obstruction in the path of the closer cell so that service by the more remote cell is preferable.

The present invention thus substantially improves the accuracy of locating a mobile transceiver without requiring any additional hardware and without increasing cellular system response time. As has been illustrated in the examples above, the handoff process can be easily and significantly improved by the present invention. The number of handoffs during an ongoing call is reduced (thus increasing the reliability and overall communications quality of the system), and interference is also reduced.

In the examples set forth above, the weighting factor n was assumed to be 0.3. While this weighting factor value is suitable for some cellular systems, a theoretical discussion of the considerations involved in choosing a value for weighting factor n will now be presented. This discussion together with observed system performance is useful in choosing values of n for an actual cellular system.

Figure 4:
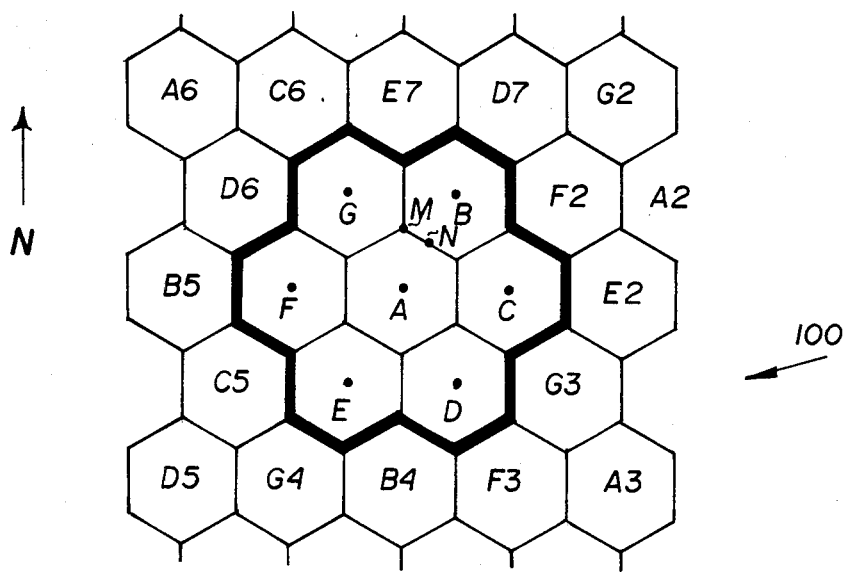
FIG. 4 is a schematic illustration of an exemplary omni-directional-type cellular communications system employing frequency reuse.

FIG. 4 shows a mature, omni directional cellular system 100 using frequency reuse. In system 100, all cells designated with the same alphabetic character use the same frequency set (e.g., cells A, A2, A3 and A6 all use the same frequency set; cells B, B4, and B5 all use the same frequency set different from the set used by the cells designated with the letter "A"; etc.).

Cellular system 100 shown in FIG. 4 also includes two mobile radio transceiving stations 18 at locations M and N respectively. Mobile transceiver M is positioned at the intersection between cells A, B and G, and mobile transceiver N is located in the area of overlap between cells A and B.

Assume that both mobile transceivers M and N are presently being served by cell A and that both of these mobile transceivers are moving away from cell A so that handoffs are necessary.

As mentioned above, it is generally desirable to serve a mobile transceiver with the cell site it is the closest to. There are occasions, however, when other stations can provide better service. The "correct" handoff transferee cell may be defined as the cell which provides a reliable RF signal path, prevents excessive or undue interference, prevents lost calls, and minimizes the number of handoffs between cells. Handoffs to physically remote cells may produce excessive interference in cellular system 100 (which uses frequency reuse) as will be demonstrated in the following example.

Suppose mobile transceiver M is erroneously handed off to cell E (southeast of cell A) because the locating receiver located at the cell E cell site momentarily receives the strongest signal from the mobile due to shadowing. If mobile transceiver M is handed off to cell E, it may operate on the same channel (frequency) as a mobile transceiver being served by cell E7. Due to the close proximity of mobile transceiver M to cell E7, strong interference may result. Communications quality may be poor, cross-talk may be heard, and possibly, mobile transceiver M might transpond to the control signals transmitted from the cell site of cell E7 rather than to those transmitted from the cell site of cell E. Even if interference does not result, it is unlikely that cell E will provide a good radio frequency signal path for any length of time after mobile transceiver M has entered cells B or G—causing a further handoff request to be generated.

The likely candidates for handoff from cell E are cells A, D, B4, G4, C5 and F (that is, those cells overlapping cell E). It is likely that none of these cells will accept the handoff request generated by cell E (if mobile transceiver M is located within cell B or G, the signal strength received by each of these candidate cells may very likely be less than the handoff delta threshold value). If none of these candidate cells accept the handoff, the ongoing call may be dropped—even though mobile transceiver M is located where it can be provided with acceptable service.

Thus, when mobile transceiver M is located as shown in FIG. 4, a handoff to cell C, D, E or F would be erroneous. Cells B and G are "correct" cells to handoff a mobile transceiver M to. Similarly, it would be an error to handoff mobile transceiver N call to cell D, E, or F—while cells C, B or G would be proper candidates for accepting handoffs.

Assume further that the distances between mobile transceiver M and various cell sites are as set forth in Table VIII below, and that the distances between mobile transceiver N various cell sites are set forth in Table IX below.

TABLE VIII

| Mobile M to Cell Site | Distance |
|---|---|
| B | 1 |
| C | 2 |
| D | $\sqrt{7}$ |

TABLE IX

| Mobile N to Cell Site | Distance |
|---|---|
| B | $\sqrt{3}/2$ |
| C | $3/2$ |
| D | $\sqrt{21}/2$ |
| E | $1.5\sqrt{3}$ |

The probability density function f(x) of a variable x with normal distribution is:

$$f(x) = \frac{e^{(-(x-\mu)^2/2s^2)}}{s \cdot \sqrt{2\pi}} \qquad (2)$$

where $\mu$ is the mean value of x, s is the standard deviation, and $s^2$ is the variance.

Propagation with shadowing results in a log-normal distribution, as mentioned above. This means that the log of the value has a normal distribution and that the signal value x is expressed in decibels.

Generally, up to six different signal values (corresponding to the RSSI values reported by the six cells neighboring the serving cell) are considered for comparison by digital signal processor 32 (for the cellular system shown in FIG. 4) in calculating a weighted average value. Processor 32 preferably sorts these values in descending order and selects the highest value as the candidate cell to which the call is to be handed off. Each of these values has a log-normal distribution.

From theory, we know that the sum of terms with normal distribution $$y = \text{sum } (n_i x_i) \qquad (3)$$

where $n_i$ are constants, also has a normal distribution with $$\text{Mean} = \text{sum } (n_i \mu_i) \qquad (4)$$

and $$\text{Variance} = \text{sum } (n_i^2 s_i^2) \qquad (5)$$

Assume that s (the standard deviation) depends on the environment but that it is identical at a given cell site for all of the measured values (in urban, cluttered or hilly areas s can be up to 12 dB, while in suburban areas it is usually smaller, typically about 6 dB).

The sorting algorithm discussed above can be regarded as a series of comparisons of pairs of weighted averages. Each comparison, in turn, may be expressed as a difference calculation. For instance, weighted average values corresponding to cells B and C may be compared using the following difference calculation, $$DIF_{BC} = RSSI_B + (n \cdot RSSI_C) + (n \cdot RSSI_G) - RSSI_C - (n \cdot RSSI_B) - (n \cdot RSSI_D) \qquad (6)$$

which may be simplified as $$DIF_{BC} = (RSSI_B - RSSI_C)(1-n) + n(RSSI_G - RSSI_D) \qquad (7)$$

(If the value $DIF_{BC}$ is greater than 0, cell B is preferred. On the other hand, cell C is preferred if value $DIF_{BC}$ is less than 0.

It will be noticed from a comparison of Equation 7 with Equation 1 that a division by $(1+k \cdot n)$ is missing from Equation 7. The division in Equation 7 is unnecessary if the weighted average RSSI calculated for each cell is based upon the RSSI measured for that cell and the RSSI of a constant number of neighboring cells (e.g., 2). In the following examples, all weighted average RSSI calculations are performed using the RSSI values measured by two neighboring cells—and thus, the division is omitted because it does not affect the results. It should be kept in mind that division is necessary whenever weighted average values calculated for different numbers of neighboring cells are compared.

The mean and the variance of the difference value DIF may be calculated for different values weighting factor of n to determine the optimum value of the weighting factor for the system shown in FIG. 4. The mean and variance values are then normalized (i.e., transformed from x to z), and the probability of making a wrong decision (DIF less than 0) is calculated for a cumulative normal distribution (which may be obtained from a standardized table).

Six exemplary cases will now be presented. The first case presents the optimum value determination of weighting factor n for a comparison of weighted average values associated with cells B and C for both mobile transceiver M and mobile transceiver N. The second case presents the optimum value determinations for n for comparison of the weighted average values of cells B and D. The third case relates to the comparison of the weighted average values of cells B and E, while the fourth case relates to comparison of weighted average values for cells B and F. A fifth case relates to the comparison of the weighted average values of cells C and D, and the sixth case relates to the comparison of weighted average values for cells C and E.

CASE I: COMPARISON OF CELLS B AND C

Mean of
$$DIF_{BC} = (RSSI_B - RSSI_C)(1-n) + (RSSI_G - RSSI_D) \cdot n$$

The normalized variance may be given as $$V_{norm} = \frac{S^2 \text{ TOTAL}}{S^2} = 2[(1-n)(1-n) + n^2]$$

$$= 2 - 4n + 4n^2$$

The normalized standard deviation is computed as $$s_{norm} = \sqrt{V_{norm}}$$

and is set forth in the following Table X for different values of n:

TABLE X

| n | 0 | .3 | .5 | .7 | 1 |
|---|---|----|----|----|---|
| $V_{norm}$ | 2 | 1.16 | 1 | 1.16 | 2 |
| $s_{norm}$ | 1.4 | 1.08 | 1 | 1.08 | 1.4 |

The standard deviation of the sum is $s_{norm} * s$.

(Case I-A) MOBILE M

Mean of $DIF_{BC} = 11.1 (1-n) + 15.7 n$

The calculated values for s=6 dB are shown in the following Table XI:

TABLE XI

| n | 0 | .3 | .5 | .7 | 1 | |
|---|---|----|----|----|---|---|
| Mean | 11.1 | 12.1 | 13.4 | 14.3 | 15.7 | dB |
| s6 | 8.5 | 6.5 | 6 | 6.5 | 8.5 | dB |
| z6 = mean/s6 | 1.29 | 1.9 | 2.2 | 2.2 | 1.85 | |
| F(z6) | .903 | .971 | .986 | .986 | .968 | |
| er6 = 1 − F(z6) | 9.8 | 2.9 | 1.4 | 1.4 | 3.2 | % |

For a weighting factor n=0.5, the present invention reduces the probability of handing off to cell C rather than to cell B by 7 (from 9.8% to 1.4%). The improvement in handoff errors is even higher since $RSSI_C$ has to be higher than $RSSI_B$ and $RSSI_G$ before a wrong handoff occurs (and thus, the two probabilities are multiplied to get the probability of a wrong handoff).

In this case, the optimum value for n is about 0.6. This is because the difference of the signal levels for the neighboring cells is higher than that of the candidate cells and equal s-values have been assumed for all measurements. If the difference of the signal levels for the neighboring cells is less than that of the signal levels for the candidate cells, a value of less than 0.5 might be better.

Similarly, for s=9 dB and 12 dB the following results are obtained (as set forth in Table XII):

TABLE XII

| n | 0 | .3 | .5 | .7 | 1 | |
|---|---|---|---|---|---|---|
| s9 | 12.7 | 9.7 | 9 | 9.7 | 12.7 | dB |
| z9 | .87 | 1.29 | 1.49 | 1.47 | 1.24 | |
| er9 | 19.2 | 9.9 | 6.8 | 7.1 | 10.8 | % |
| s12 | 17 | 13 | 12 | 13 | 17 | dB |
| z12 | .65 | .96 | 1.12 | 1.1 | .92 | |
| er12 | 25.8 | 16.9 | 13.3 | 13.6 | 17.9 | % |

The present invention preferably only considers a candidate cell if its RSSI is higher than a predetermined threshold. This prevents handoffs to cells that cannot handle the call and is thus an additional safety factor.

(Case I-B) MOBILE N

As mentioned previously, a handoff of a mobile N call to cell C is not considered to be an error. While such a call handoff is, in general, undesirable, it is never catastrophic—the resulting possibility of an increase in interference is rather small, and any interference is normally of short duration. Since cell C (and cell G) are neighboring cells of cell B, it is always possible to hand the call back to cell B—and this is likely to happen if and when the signal gets weaker at cell B. It is, however, of interest to determine the likelihood of this type of handoff since it shows the probability of two consecutive handoffs where one might have been sufficient.

The equations discussed above remain unchanged, except that the distances of the mobile transceiver to the different sites have changed and consequently, the relative signal levels are different.

The relative distances from mobile N to the various cell sites and the corresponding signal levels are set forth in Table XIII below:

TABLE XIII

| | B | C | D | E | F | G | |
|---|---|---|---|---|---|---|---|
| Dist. | 1 | 1.73 | 2.65 | 3 | 2.65 | 1.73 | |
| Signal | 0 | −8.8 | −15.6 | −17.7 | −15.6 | −8.8 | (dB) |

The mean of the difference value is calculated as:

Means of $DIF_{BC} = 8.8(1-n) + 6.8n$

The following Table XIV shows the various statistical parameters for different values of weighting factor n:

TABLE XIV

| n | 0 | 0.3 | 0.5 | 0.7 | 1 | |
|---|---|---|---|---|---|---|
| mean | 8.8 | 8.2 | 7.8 | 7.4 | 6.8 | dB |
| s6 | 8.5 | 6.5 | 6 | 6.5 | 8.5 | dB |
| z6 | 1.04 | 1.26 | 1.3 | 1.14 | .8 | |
| er6 | 14.9 | 10.4 | 9.7 | 12.7 | 21.2 | % |

Note that there is an improvement when the neighbor cells are considered in spite of the fact that the weighted average of the neighbor cells of cell B is less than that of the neighbor cells of cell C—that is, $RSSI_C + RSSI_G = -17.6$ dB $< RSSI_B + RSSI_D < -15.6$ dB.

The reason for the improvement is that the standard deviation has been reduced. However, the improvement is not as dramatic as before. Since $RSSI_G - RSSI_D < RSSI_B - RSSI_C$, the optimum value of n is slightly less than 0.5.

CASE II: COMPARISON OF CELLS B AND D $DIF_{BD} = RSSI_B + n(RSSI_C + RSSI_G) - RSSI_D -$ $$n(RSSI_C + RSSI_E)$$

$= RSSI_B - RSSI_D + n(RSSI_G - RSSI_D)$

The normalized variance and the normalized standard deviation for four terms can be calculated as before:

$$V_{norm} = 2 + 2n^2$$

$$s_{norm} = \sqrt{V_{norm}}$$

(CASE II-A) MOBILE M

The mean of the difference is calculated as

Mean of $DIF_{BD} = 15.7(1+n)$

The following Table XV sets forth the various statistical parameters for various values of weighting factor n:

TABLE XV

| n | 0 | 0.3 | 0.5 | 0.7 | 1.0 | |
|---|---|---|---|---|---|---|
| $V_{norm}$ | 2 | 2.18 | 2.5 | 2.98 | 4.0 | |
| $s_{norm}$ | 1.4 | 1.48 | 1.53 | 1.73 | 2.0 | |
| s6 | 8.5 | 8.9 | 9.5 | 10.4 | 12.0 | dB |
| s9 | 12.7 | 13.3 | 14.2 | 15.5 | 18.0 | dB |
| s12 | 17.0 | 17.8 | 19.0 | 20.7 | 24.0 | dB |
| mean | 15.7 | 20.4 | 23.5 | 26.4 | 31.4 | dB |
| z6 | 1.85 | 2.29 | 2.47 | 2.54 | 2.61 | |
| z9 | 1.24 | 1.53 | 1.65 | 1.7 | 1.74 | |
| z12 | .92 | 1.15 | 1.23 | 1.27 | 1.31 | |
| er6 | 3.2 | 1.1 | 0.7 | 0.55 | 0.5 | % |
| er9 | 10.8 | 6.3 | 5.0 | 4.5 | 4.1 | % |
| er12 | 17.9 | 12.5 | 10.9 | 10.2 | 9.7 | % |

Optimum vlaues are obtained for n=1. This corresponds to the case where equal weight is given to the candidate cells and the neighbor cells remaining after the subtraction. Note, however, that if the mobile is at point N, n=0.6 is preferred (as is demonstrated below in Table XVI).

(Case II-B) MOBILE N

Mean of $DIF_B = 15.6 + 8.9n$

TABLE XVI

| n | 0 | 0.3 | 0.5 | 0.7 | 1 | |
|---|---|---|---|---|---|---|
| mean | 15.6 | 18.3 | 20 | 21.8 | 24.5 | |
| s6 | 8.5 | 8.9 | 9.5 | 10.4 | 12 | dB |
| z6 | 1.84 | 2.07 | 2.11 | 2.1 | 2.04 | |
| er6 | 3.3 | 1.9 | 1.7 | 1.8 | 2.1 | % |
| er12 | 17.9 | 15 | 14.5 | 14.7 | 15.4 | % |

CASE III: COMPARISON OF CELLS B AND E $DIF_{BE} = RSSI_B + n(RSSI_C + RSSI_G) - RSSI_E - n(RSSI_D - RSSI_F)$

The normalized variance and the normalized standard deviation for six terms are:

$V_{norm} = 2 + 4n^2$ $s_{norm} = \sqrt{V_{norm}}$

(Case III-A) MOBILE M

Mean of $DIF_{BE} = 15.7(1+n)$

TABLE XVII

| n | 0 | 0.3 | 0.5 | 0.7 | 1 | |
|---|---|---|---|---|---|---|
| $V_{norm}$ | 2 | 2.36 | 3 | 3.96 | 6 | |
| $s_{norm}$ | 1.4 | 1.54 | 1.73 | 1.98 | 2.45 | |
| mean | 15.7 | 20.4 | 23.5 | 26.7 | 31.4 | dB |
| s6 | 8.5 | 9.2 | 10.4 | 11.9 | 14.7 | dB |
| z6 | 1.85 | 2.22 | 2.26 | 2.24 | 2.14 | |
| er6 | 3.2 | 1.3 | 1.2 | 1.3 | 1.6 | % |
| s9 | 12.7 | 13.8 | 15.6 | 17.8 | 22 | dB |
| z9 | 1.24 | 1.48 | 1.51 | 1.5 | 1.43 | |
| er9 | 10.8 | 6.9 | 6.5 | 6.7 | 7.4 | % |
| s12 | 17 | 18.4 | 20.8 | 23.8 | 29.4 | dB |
| z12 | .92 | 1.11 | 1.13 | 1.12 | 1.07 | |
| er12 | 17.9 | 13.3 | 12.8 | 13.1 | 14.2 | % |

Here n=0.5 is best (for n=0.5, the sum of the RSSI of the two neighboring cells is weighted equally with the RSSI of the candidate cell). In spite of the fact that cells D and E are equally distant from mobile M, the improvement for cell E is less than the improvement for cell D. This can be explained by rewriting the difference equation as follows:

$DIF_{BE} = (RSSI_B - RSSI_E) + n \cdot (RSSI_G - RSSI_D) + n \cdot (RSSI_C - RSSI_F)$ The third term, which is not present when B and D are compared, has a mean value of zero and does not increase the mean of the difference. However, it increases the standard deviation of the sum.

(Case III-B) MOBILE N

Mean of $DIF_{BE} = 17.7 + 13.4n$

TABLE XVIII

| n | 0 | 0.3 | 0.5 | 0.7 | 1 | |
|---|---|---|---|---|---|---|
| mean | 17.7 | 21.7 | 24.4 | 27 | 31.1 | |
| s6 | 8.5 | 9.2 | 10.4 | 11.9 | 14.7 | dB |
| z6 | 2.08 | 2.36 | 2.35 | 2.28 | 2.16 | |
| er6 | 1.9 | 0.9 | 0.9 | 1.1 | 1.5 | % |
| er12 | 14.9 | 10 | 10 | 12.7 | 14 | % |

CASE IV: COMPARISION OF CELLS B AND F $DIF_{BF} = RSSI_B + n \cdot (RSSI_C + RSSI_G) - RSSI_F - n \cdot (RSSI_G + RSSI_E)$ $= RSSI_B - RSSI_F + n \cdot (RSSI_C - RSSI_E)$ $V_{norm} = 2 + 2n^2$ $s_{norm} = \sqrt{V_{norm}}$

(Case IV-A) MOBILE M

Mean of $DIF_{BF} = 11.1 + 4.6n$

TABLE XIX

| n | 0 | 0.3 | 0.5 | 0.7 | 1 | |
|---|---|---|---|---|---|---|
| $V_{norm}$ | 2 | 2.18 | 2.5 | 2.98 | 4 | |
| $s_{norm}$ | 1.4 | 1.48 | 1.58 | 1.73 | 2 | |
| s6 | 8.5 | 8.9 | 9.5 | 10.4 | 12 | dB |
| s9 | 12.7 | 13.3 | 14.2 | 15.5 | 18 | dB |
| s12 | 17 | 17.8 | 19 | 20.7 | 24 | dB |
| mean | 11.1 | 12.5 | 13.4 | 14.3 | 15.7 | dB |
| z6 | 1.29 | 1.4 | 1.41 | 1.38 | 1.31 | dB |
| er6 | 9.8 | 8.1 | 7.9 | 8.4 | 9.5 | % |
| er12 | 26 | 24.2 | 24 | 24.5 | 25.5 | % |

Optimum values are obtained for n=0.5.

(Case IV-B) MOBILE N

Because of symmetry, this is identical to Case II-B (Prob. (d>b)).

CASE V: COMPARISON OF CELLS C AND D

(Case V-A) MOBILE N $DIF_{CD} = RSSI_C + n \cdot RSSI_B + n \cdot RSSI_D - RSSI_D - n \cdot RSSI_C - n \cdot RSSI_E$ $= (RSSI_C - RSSI_D)(1 - n) + n \cdot (RSSI_B - RSSI_E)$ $= 6.8(1 - n) + 17.7 \cdot n$

TABLE XX

| n | 0 | .3 | .5 | .7 | 1 | |
|---|---|---|---|---|---|---|
| mean | 6.8 | 10.1 | 12.3 | 14.4 | 17.7 | dB |
| s6 | 8.5 | 6.5 | 6 | 6.5 | 8.5 | dB |
| z6 | .8 | 1.56 | 2.05 | 2.21 | 2.08 | dB |
| er6 | 21.2 | 5.9 | 2.0 | 1.4 | 1.9 | % |
| er12 | 34.5 | 21.8 | 15.1 | 13.6 | 14.9 | % |

CASE VI: COMPARISON OF CELLS C AND E

(Case VI-A) MOBILE N $DIF_{CE} = RSSI_C + n \cdot RSSI_B + n \cdot RSSI_D - RSSI_E - n \cdot RSSI_D - n \cdot RSSI_F$ $= RSSI_C - RSSI_E + n \cdot (RSSI_B - RSSI_F) = 8.9 + 15.6n$

TABLE XXI

| n | 0 | 0.3 | 0.5 | 0.7 | 1 | |
|---|---|---|---|---|---|---|
| mean | 8.9 | 13.6 | 16.7 | 19.8 | 24.5 | |
| s6 | 8.5 | 8.9 | 9.5 | 10.4 | 12 | dB |
| s9 | 12.7 | 13.3 | 14.2 | 15.5 | 18 | dB |
| s12 | 17 | 17.8 | 19 | 20.7 | 24 | dB |
| z6 | 1.05 | 1.53 | 1.76 | 1.9 | 2.04 | % |
| er6 | 14.7 | 6.3 | 3.9 | 2.9 | 2.1 | % |
| er12 | 30 | 25.3 | 18.9 | 17.1 | 15.4 | % |

The average probability of error might best be calculated using a computer simulation. However, the calculations set forth above clearly show that the present invention results in a significant reduction of the number of wrong handoffs.

From a study of cases I-VI above, it appears that the optimum of value of weighting factor n is about 0.5—and this value is recommended for a typical cellular system. The use of a weighting factor of n=0.5 always results in higher accuracy in handoff decision making. The improvement ratio is highest for low values of standard deviation because all of the measurements are then more accurate.

For higher values of standard deviation, the improvement ratio is smaller but the percentage of wrong handoffs is still significantly reduced. The reason for the lower improvement ratio is that it has been assumed for purposes of the examples that the measurements for all six cells have the same standard deviation. It is unlikely that all of the measurements will be simultaneously highly inaccurate (because each measurement is statistically independent of the others), so that the improvement ratio will actually be higher than indicated by the case examples set forth above.

Further improvements may be realized by considering more cells (e.g., a secondary layer of cells) or by "customizing" the weighting factor n for each pair of cells to be compared. Such an implementation would require longer tables of neighboring cells and additional data traffic between the cell sites and the central controller. The additional complexity of system 100 may not be worthwhile unless maximum optimization of handoff decision making is critically important.

A method and system for improving handoff decision making in a cellular radio communications system has been presented. The invention improves the accuracy of locating a mobile transceiver in a cellular radio telephone communications system without requiring any additional hardware and without increasing response time. The handoff process is improved and the number of handoffs during a given conversation or call is reduced—increasing communications reliability and decreasing the possibility of communications interference and/or lost communications. The present invention may be used to great advantage in omni-directional or non-omni-directional cellular systems, and can be customized for specific systems if desired.

While the present invention has been described with what is presently considered to be the most practical and preferred embodiments, it is to be understood that the appended claims are not to be limited to the disclosed embodiments but on the contrary, are intended to cover all modifications, variations and/or equivalent arrangements which retain any of the novel features and advantages of this invention.

By way of non-limiting example, although the preferred embodiment takes a fixed number of neighboring cells into account when calculating a weighted average for a particular candidate cell, it might be advantageous in some applications to take a variable or different number of neighboring cells into account (e.g., three or five neighboring cells) in order to further decrease the effect of statistical variations in received signal strength.

Likewise, although weighted averages are computed in the preferred embodiment for a candidate cell using received signal strength measurements performed by cells covering geographical areas overlapping the candidate cell, different criteria for what constitutes a "neighboring" cell might be chosen, depending upon the geographical configuration of the cellular system. For example, cellular systems in which cells have been split may include a large number of cells which are geographically close to one another but which do not necessarily overlap one another—in such a system, geographically proximate cells may be considered "neighboring" cells if desired.

Different priority levels might be used for candidates cells to allow a second set of cells to be tested as handoff candidates when the handoff candidates of the highest priority level (e.g., cells directly adjacent to the cell presently handling the call) do not provide sufficient strength. Moreover, the weighting factor n might be customized for individual cells (or sets of cells) to further increase performance. Further, although the discussion above assumes that the mobile transceiver is already being served by a cell and that the present invention is used to determine the best handoff candidate, the invention can also be used to select a serving cell to handle a new call (e.g. by initially generating an arbitrary list of cells to measure the mobile transceiver RSSI, which list may specify all of the cells within a particular area if desired).

Although the weighted average calculations of the present invention are performed by central controller 16 in the preferred embodiment, these calculations (or parts of the calculations) might be performed by one or more cell site controllers 26 and/or mobile transceiver controller 22.

What is claimed is:

1. In a cellular radio communications system of the type including plural stationary radio frequency receivers serving corresponding plural geographical cells, a mobile radio frequency communications apparatus including:
   radio frequency transmitting means for transmitting radio frequency signals to said plural stationary receivers; and
   control means, connected to and controlled by said transmitting means and operatively connected to said plural stationary receivers, for controlling said transmitting means to transmit radio signals to a stationary receiver selected in response to a value calculated from (a) the amplitude of a radio frequency signal transmitted by said transmitting means and received by said selected stationary receiver, and (b) the amplitude of said transmitted radio frequency signal received by at least one further stationary receiver serving a geographical cell in proximity to the geographical cell served by said selected stationary receiver.

2. In a cellular radio communications system of the type including:
   plural stationary radio transceivers disposed at corresponding associated plural geographical locations, different stationary transceivers transmitting and receiving radio frequency signals on different radio frequency communication channels corresponding thereto, each stationary transceiver including locating receiver means for receiving radio frequency signals transmitted on any selected one of said different radio frequency communication channels and for measuring the signal strength of said received signals, and
   central control means, connected to control said plural stationary transceivers and also connected to receive said signal strength measurements, for communicating signals reporting said measured signal strengths to mobile radio transceivers via at least one stationary transceiver, the improvement comprising a mobile radio communications device including:

tunable radio frequency transmitting means for transmitting radio signals over a selected radio frequency communications channel;

tunable radio frequency receiving means for receiving radio signals communicated thereto by said central control means via a stationary transceiver; and control means, connected to control said transmitting means, for selecting said radio frequency communications channel in response to the weighted average of the signal strength measured by the stationary transceiver corresponding to said selected channel and the signal strength measured by at least one further stationary transceiver located in proximity to the stationary transceiver corresponding to said selected channel.

3. In a cellular radio communications system of the type including plural stationary radio receivers serving corresponding plural geographical cells, a mobile radio communications apparatus including:

tunable radio frequency transmitting means for transmitting radio signals to said plural stationary receivers;

tuning means connected to said transmitting means for tuning said transmitting means to transmit radio signals on a selected radio frequency communications channel; and control means, connected to said tuning means and operatively connected to said plural stationary receivers, for controlling said tuning means to tune said transmitting means to transmit radio signals to a stationary receiver selected in response to the weighted average of the amplitude of said transmitted radio signal received by said selected stationary receiver and the amplitude of said transmitted radio signal received by at least one further stationary receiver serving a geographical cell in proximity to the geographical cell served by said selected stationary receiver.

4. In a cellular radio communications system of the type including plural stationary radio transceivers serving corresponding plural overlapping geographical cells, said plural stationary transceivers transmitting radio signals to and receiving radio signals transmitted by mobile radio transceivers located within said cells, a first of said plural stationary transceivers including:

locating receiver means for receiving radio signals transmitted by a mobile radio transceiver and for producing a signal indicating the amplitude of said received radio signals; and digital signal processing means, connected to receive said indicating signal and also operatively connected to others of said plural stationary receivers, said processing means being preprogrammed to perform the following functions:

(a) compute the weighted average of (1) the amplitude-indicating signal produced by said first stationary transceiver locating receiver, and (2) amplitude-indicating signals produced by further stationary transceiver locating receivers associated with geographical cells overlapping the geographical cell served by said first stationary transceiver, (b) compare the level of said weighted average with a predetermined level, and (c) control said first stationary transceiver to transmit radio signals to and receive radio signals from said mobile transceiver if said comparison reveals the level of said weighted average exceeds said predetermined level.

5. In a cellular radio communications system of the type including:

plural stationary radio transceivers disposed at corresponding associated plural geographical locations, different stationary transceivers transmitting and receiving radio frequency signals on different corresponding radio frequency communication channels, each stationary transceiver including locating receiver means for receiving radio frequency signals transmitted on any selected one of said different radio frequency communication channels and for producing an indication of the signal strength of said received signals, and at least one mobile radio transceiver including tunable radio frequency transmitting means for transmitting radio signals over a selected radio frequency communications channel, said mobile transceiver also including control signal receiving means for receiving control signals and for selecting said communications channel in response to said control signals, the improvement comprising:

central control means, connected to receive said received signal strength indications, for calculating a value from: (a) the signal strength a radio signal transmitted by said mobile transceiver transmitting means is received at the selected stationary transceiver, and (b) the signal strength said transmitted radio signal is received by at least one further stationary transceiver located in proximity to the selected stationary transceiver, for selecting a stationary transceiver to communicate with said mobile transceiver in response to said calculated value, and for controlling at least one stationary transceiver to transmit control signals to said mobile transceiver control signal receiving means so as to control said mobile transceiver transmitting means to tune to the communications channel corresponding to said selected stationary transceiver.

6. A system as in claim 5 wherein said central control means includes a digital signal processor operatively connected to said plural stationary transceivers and preprogrammed so as to perform the following functions:

(a) control the locating receiver means of a first stationary transceiver to measure the amplitude of a signal transmitted by said mobile transceiver transmitting means;

(b) control the locating receiver means of a further stationary transceiver located in proximity to the first stationary transceiver to measure the amplitude of said transmitted radio signal;

(c) calculate a sum of: (1) the signal strength said radio signal transmitted by said mobile transceiver transmitting means is received by the first stationary transceiver locating receiving means, and (2) the signal strength said transmitted radio signal is received by the locating receiver means of said further stationary transceiver so as to yield a sum corresponding to said first stationary transceiver;

(d) test the magnitude of the calculated sum; and (e) if said test reveals said magnitude exceeds a predetermined level, direct said mobile transceiver transmitting means to tune to a communications channel corresponding to said first stationary transceiver.

7. A system as in claim 5 wherein said central control means includes a digital signal processor operatively connected to said plural stationary transceivers and preprogrammed so as to perform the following functions:

(a) control the receiving means of each stationary transceiver to measure the amplitude of a radio signal transmitted by said mobile transceiver transmitting means;

(b) multiply a predetermined weighting factor by the signal strength said transmitted radio signals are received by the locating receiver means of at least one further stationary transceiver located in proximity to said first stationary transceiver to yield a product;

(c) add the signal strength radio signals transmitted by said mobile transceiver transmitting means are received by said first stationary transceiver receiving means to the product to yield a sum corresponding to said first stationary transceiver;

(d) perform said functions (b) and (c) for each of said stationary transceivers;

(e) select the stationary transceiver corresponding to the calculated sum with the highest magnitude; and (f) direct said mobile transceiver transmitting means to tune to a communications channel corresponding to said selected stationary transceiver.

8. A system as in claim 7 wherein said predetermined weighting factor is less than one.

9. A system as in claim 7 wherein said predetermined weighting factor is substantially equal to 0.5.

10. A system as in claim 7 wherein said predetermined weighting factor is within the range of 0.2 and 0.6.

11. A system as in claim 7 wherein said stationary transceivers have different weighting factors associated therewith.

12. A system as in claim 5 wherein said central control means includes a digital signal processor operatively connected to said plural stationary transceivers and preprogrammed so as to perform the following functions:

(a) select a subset of said stationary transceivers;

(b) control the receiving means of each stationary transceiver in said subset to measure the amplitude of a radio signal transmitted by said mobile transceiver transmitting means;

(c) receive the signal strength indicating signals produced by said stationary transceiver locating receiver means;

(d) calculate, for each stationary transceiver in said subset, a corresponding sum of the signal strength radio signals transmitted by said mobile transceiver transmitting means are received by the stationary transceiver locating receiver means and the signal strength said transmitted radio signals are received by the locating receiver means of at least one further stationary transceiver, not necessarily within said subset but located in proximity to the stationary transceiver corresponding to said sum, so as to yield a sum corresponding to each of said stationary transceivers in said subset;

(e) select the stationary transceiver corresponding to the calculated sum with the highest magnitude; and (f) direct said mobile transceiver transmitting means to tune to a communications channel corresponding to said selected stationary transceiver.

13. A system as in claim 5 wherein:

said mobile transceiver transmitting means transmits radio signals over a communications channel corresponding to a serving stationary transceiver, and said central control means includes a digital signal processor operatively connected to said plural stationary transceivers and preprogrammed so as to perform the following functions:

(a) determine the set of stationary transceivers which are geographically proximate to said serving stationary transceiver;

(b) control the locating receiver means of each stationary transceiver in said set to measure the amplitude of a radio signal transmitted by said mobile transceiver transmitting means;

(c) receive the signal strength indicating signals produced by said plural stationary transceiver locating receiver means;

(d) calculate, for each stationary transceiver in said set, a corresponding sum of the signal strength said radio signal transmitted by said mobile transceiver transmitting means is received by the stationary transceiver locating receiver means and the signal strength said transmitted radio signal is received by the locating receiver means of at least one further stationarY transceiver, not necessarily within said set but located in proximity to the stationary transceiver corresponding to said sum, so as to yield a sum corresponding to each of said stationary transceivers in said subset;

(e) select the stationary transceiver corresponding to the calculated sum with the highest magnitude; and (f) direct said mobile transceiver transmitting means to tune to the communications channel corresponding to said selected stationary transceiver.

14. In a cellular radio communications system of the type including plural stationary radio transceivers $T_1$-$T_N$ serving corresponding plural overlapping geographical cells $C_1$-$C_N$ and transmitting radio signals to and receiving radio signals transmitted by mobile radio transceivers located within said cells, each stationary transceiver having a locating receiver associated therewith, which receives radio signals transmitted by a selected mobile radio transceiver and produces signals indicating the amplitude of said received mobile radio transceiver radio signals, an improved central controller digital signal processor connected to control said plural stationary transceivers and to receive said amplitude indicating signals, said processor being preprogrammed to perform the following steps:

(1) determine the stationary transceivers which serve cells overlapping the cell $C_1$ served by a first stationary transceiver $T_1$;

(2) multiply the levels of amplitude-indicating signals produced by locating receivers associated with said determined stationary transceivers by a weighting factor n less than one;

(3) add said multiplied levels to the level of the amplitude-indicating signal produced by the locating receiver associated with said first stationary transceiver $T_1$ to produce a sum;

(4) divide said sum by 1+ the product of n and the number of determined stationary transceivers to yield a value $V_1$ associated with said transceiver $T_1$;

(5) repeat said functions (1)-(4) for each of said plural stationary transceivers $T_2$-$T_N$ to yield corresponding values $V_2$-$V_N$ associated with said transceivers $T_2$-$T_N$;

(6) select the largest of said values $V_1$-$V_N$; and (7) control the stationary transceiver associated with said selected value to transmit signals to and receive signals from said selected mobile transceiver.

15. A system as in claim 14 wherein said weighting factor n is less than one.

16. A system as in claim 14 wherein said weighting factor is within the range of 0.2 to 0.6.

17. A system as in claim 14 wherein said weighting factor is substantially equal to 0.5.

18. A system as in claim 14 wherein each of said cells $C_1$-$C_N$ overlap a further geographical cell said selected mobile transceiver was previously within.

19. In a cellular radio telecommunications system of the type including plural stationary radio signal transceivers serving corresponding geographical areas, said system further including a mobile radio transceiver communicating radio signals with one of said plural stationary transceivers, an improved method of selecting a stationary transceiver to communicate radio signals with said mobile radio transceiver comprising the steps of:

(1) transmitting a radio signal from said mobile radio transceiver;

(2) receiving the signal transmitted by said mobile transceiver at each of said plural stationary transceivers;

(3) producing, at each stationary transceiver, a signal indicating the amplitude of said received signal;

(4) modifying the indicating signal produced by a first of said plural stationary transceivers serving a first geographical area in response to the indicating signals produced by stationary transceivers serving geographical areas nearby said first area;

(5) testing the level of said modified indicating signal; and (6) selecting said first stationary transceiver to communicate radio signals with said mobile radio transceiver if said testing step reveals the level of said modified signal exceeds a predetermined level.

20. In a cellular radio telephone communications system of the type including plural geographically-separated stationary radio transceivers serving corresponding plural discrete, overlapping geographical areas, a method of selecting one of said stationary transceivers for communicating radio signals with a mobile radio transceiver comprising the steps of:

(1) transmitting a radio signal from said mobile radio transceiver;

(2) receiving the radio signal transmitted by said mobile transceiver with each of said plural stationary transceivers;

(3) determining the amplitude level said radio signal is received at a first stationary transceiver serving a first geographical area;

(4) modifying the received amplitude level corresponding to said first stationary transceiver, in response to the received amplitude level corresponding to a further stationary transceiver serving a geographical area overlapping said first area;

(5) testing said modified received amplitude level; and (6) selecting said first stationary transceiver to communicate radio signals with said mobile radio transceiver if said testing step reveals said modified determined amplitude level exceeds a predetermined threshold.

21. A method as in claim 20 wherein:

said method further includes the steps of:

(a) determining the amplitude level said radio signal is received at said further stationary transceiver, and (b) modifying said amplitude level corresponding to said further stationary transceiver in response to said received amplitude level corresponding to said first stationary transceiver;

wherein said testing step (5) comprises comparing said modified first stationary transceiver received amplitude level with said modified further stationary transceiver received amplitude level; and wherein said selecting step (6) comprises selecting the stationary transceiver corresponding to the highest level compared by said comparing step.

22. A method as in claim 20 wherein said modifying step (4) includes:

(a) multiplying said further stationary transceiver received amplitude level by a weighting factor less than one to yield a product; and (b) adding said product to said first stationary transceiver received amplitude level.

* * * * *